(12) United States Patent
Vite Cadena

(10) Patent No.: US 11,814,013 B2
(45) Date of Patent: Nov. 14, 2023

(54) MOTION LIMITING SYSTEM FOR VEHICLE ACCESSORY

(71) Applicant: Nissan North America, Inc., Franklin, TN (US)

(72) Inventor: Manuel Alejandro Vite Cadena, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 722 days.

(21) Appl. No.: 16/995,026

(22) Filed: Aug. 17, 2020

(65) Prior Publication Data
US 2022/0048436 A1 Feb. 17, 2022

(51) Int. Cl.
B60R 7/08 (2006.01)

(52) U.S. Cl.
CPC ................ B60R 7/08 (2013.01)

(58) Field of Classification Search
CPC .......... B60R 7/08; B60R 21/026; B60R 5/04; B60R 7/04; B60N 2/91
USPC .................. 296/24.4, 24.43, 24.46; 280/748
See application file for complete search history.

(56) References Cited

U.S. PATENT DOCUMENTS

| | | | |
|---|---|---|---|
| 3,015,515 A * | 1/1962 | Halstead | B60R 21/12 296/24.42 |
| 5,058,941 A * | 10/1991 | Solomon | B60R 21/12 296/24.46 |
| 6,012,753 A | 1/2000 | Ordoyne et al. | |
| 6,467,828 B1 | 10/2002 | Grydbeck et al. | |
| 6,669,259 B2 | 12/2003 | Murray et al. | |
| 7,287,796 B2 | 10/2007 | Coles et al. | |
| 7,478,858 B1 | 1/2009 | Brun | |
| 2010/0237646 A1 * | 9/2010 | Forsyth | B60R 21/232 296/24.46 |
| 2011/0042989 A1 | 2/2011 | Heller | |

FOREIGN PATENT DOCUMENTS

| | | |
|---|---|---|
| EP | 0776791 A2 | 6/1997 |
| EP | 0787627 A1 | 8/1997 |
| EP | 1155922 A2 | 11/2001 |
| EP | 1298014 A2 | 4/2003 |
| FR | 2699875 A1 | 7/1994 |
| FR | 2951121 A3 | 4/2011 |
| JP | 2018150000 A | 9/2018 |
| WO | 2014/129074 A1 | 8/2014 |

* cited by examiner

Primary Examiner — Stephen T Gordon
(74) Attorney, Agent, or Firm — Young Basile Hanlon & MacFarlane, P.C.

(57) ABSTRACT

An apparatus is disclosed that limits forward swing of an accessory mounted in a vehicle, the accessory separating a cargo area from a passenger seating area and configured to rotate around a bracket rod. The apparatus includes a first bracket and a second bracket. The first bracket is attached to the accessory and extends perpendicularly away from the accessory. The second bracket is attached to the bracket rod and extends perpendicularly away from the bracket rod. When the first bracket contacts the second bracket, forward swing of the accessory toward the passenger seating area is limited.

20 Claims, 8 Drawing Sheets

MOTION LIMITING SYSTEM FOR VEHICLE ACCESSORY

TECHNICAL FIELD

This disclosure relates to vehicle accessories and more specifically, to a system for limiting forward motion of the accessory toward a passenger seating area of the vehicle.

BACKGROUND

Oftentimes, accessories are installed in a vehicle after purchase. For example, a pet divider may be installed to restrict pet movement within a vehicle and to confine pets to the cargo area positioned rearward of the passenger seating area. The accessory may be able to move from a stowed position, with the accessory being parallel to a roof of the vehicle, to an active position, with the accessory being perpendicular to the roof of the vehicle, creating the divider between the cargo area and the passenger seating area.

Currently used accessories swing forward toward the passenger seating area to a position where a lower portion of the accessory contacts the rear of the passenger seat. If the passenger seat is configured to recline rearward, toward the cargo area, the lower portion of the accessory contacts the rear of the reclined passenger seat, even in a reclined position. In some reclining positions of the passenger seat, the lower portion of the accessory may swing forward too far and become stuck in the rear of the passenger seat.

The present disclosure addresses this issue by limiting forward motion of the accessory toward the passenger seating area.

SUMMARY

In one aspect of the present disclosure, an apparatus limits forward swing of an accessory mounted in a vehicle, the accessory separating a cargo area from a passenger seating area and configured to rotate around a bracket rod. The apparatus includes a first bracket and a second bracket. The first bracket is attached to the accessory and extends perpendicularly away from the accessory. The second bracket is attached to the bracket rod and extends perpendicularly away from the bracket rod. When the first bracket contacts the second bracket, forward swing of the accessory toward the passenger seating area is limited.

In certain embodiments, the first bracket is rectangular in shape and the second bracket is L-shaped.

In certain embodiments, the second bracket includes a short leg connected to the bracket rod and a long leg extending perpendicularly from the short leg. The long leg extends over a portion of the accessory, so that the accessory can rotate around the bracket rod. When the first bracket contacts the long leg, forward swing of the accessory toward the passenger seating area is limited.

In certain embodiments, the first bracket is attached to the accessory proximate to a headliner of the vehicle and the second bracket is attached to the bracket rod proximate to the headliner of the vehicle.

In certain embodiments, the first bracket is positioned in front of the second bracket, relative to a front of the vehicle, so that when the accessory swings forward toward the passenger seating area, a rearward facing surface of the first bracket contacts a frontward facing surface of the second bracket.

In certain embodiments, the first bracket is attached to the accessory remote from a headliner of the vehicle and the second bracket is attached to the bracket rod remote from the headliner of the vehicle.

In certain embodiments, the first bracket is positioned behind the second bracket, relative to a front of the vehicle, so that when the accessory swings forward toward the passenger seating area, a frontward facing surface of the first bracket contacts a rearward facing surface of the second bracket.

In another aspect of the present disclosure, an apparatus limits forward swing of an accessory mounted in a vehicle, the accessory separating a cargo area from a passenger seating area and configured to rotate around a bracket rod. The apparatus includes a bracket attached to a mounting system for the accessory. The bracket includes a first portion attached to the mounting system and a second portion configured to limit forward swing of the accessory toward the passenger seating area when the accessory contacts the second portion.

In certain embodiments, the first portion is attached to the bracket rod.

In certain embodiments, the first portion is attached to a mounting bracket of the mounting system.

In certain embodiments, the second portion is flat.

In certain embodiments, the second portion is curved.

In another aspect of the present disclosure, a vehicle includes an accessory separating a cargo area from a passenger seating area, the accessory configured to rotate around a bracket rod, and an apparatus to limit forward swing of the accessory toward the passenger seating area. The apparatus includes a first bracket and a second bracket. The first bracket is attached to the accessory and extends away from the accessory. The second bracket is attached to the bracket rod and extends away from the bracket rod. When the first bracket contacts the second bracket, forward swing of the accessory toward the passenger seating area is limited.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
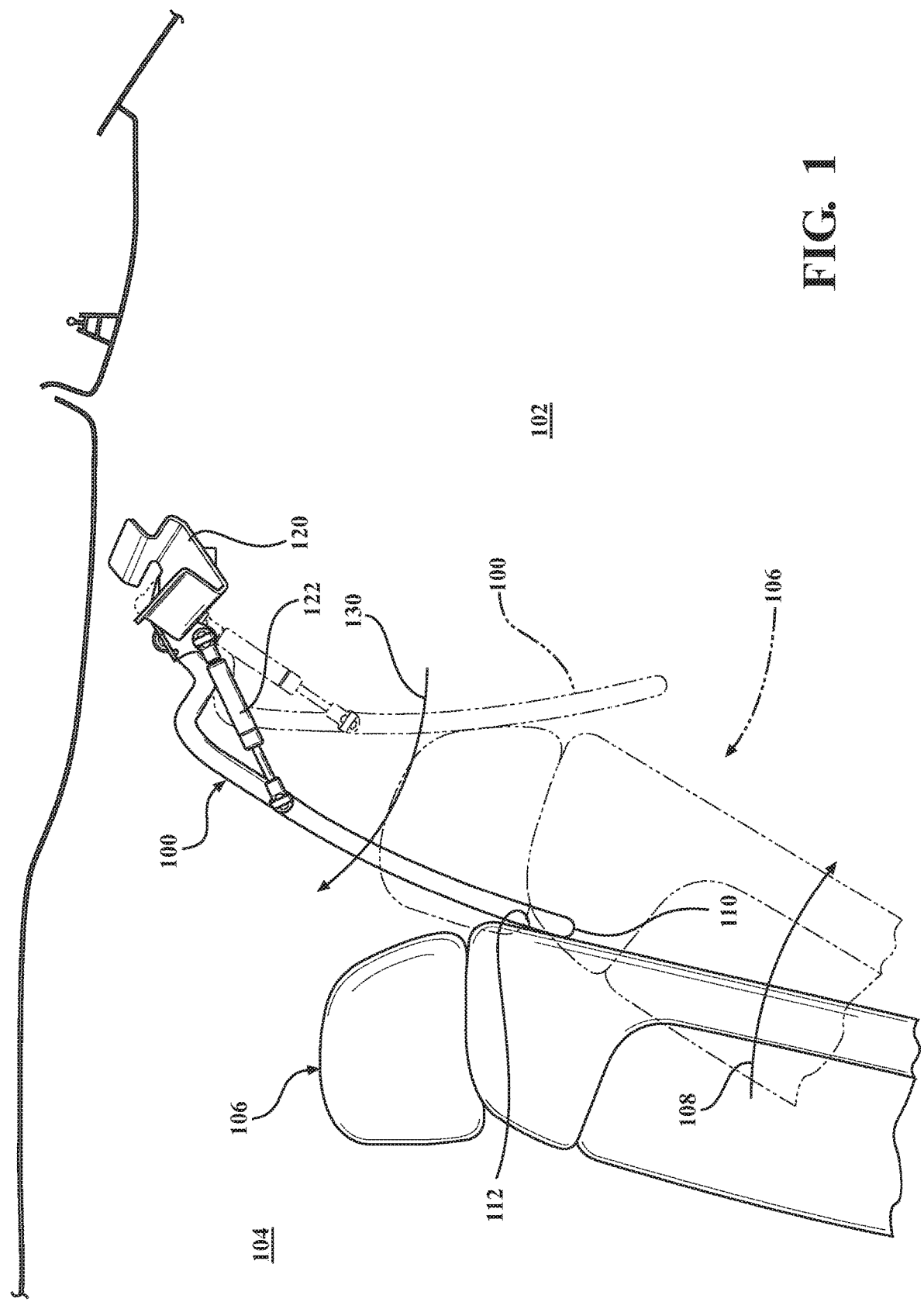
FIG. 1 is a side view of an accessory and a passenger seat in different reclining positions.

FIG. 1 is a side view of an accessory and a passenger seat in different reclining positions. An accessory 100 separates a cargo area 102 from a passenger seating area 104. It is noted that while a particular configuration of the accessory 100 is shown in the drawings, other suitable configurations for the accessory 100 are possible, and the description of the embodiments herein equally apply to such other configurations of the accessory 100.

A passenger seat 106 is configured to recline in a plurality of positions, the direction of reclining indicated by arrow 108 and an example passenger seat position is shown by dashed lines. Similarly, the accessory 100 moves in a plurality of positions relative to the passenger seat 106 (shown in FIG. 1 by dashed lines), to maintain the separation between the cargo area 102 and the passenger seating area 104. In some embodiments, a lower portion 110 of the accessory 100 contacts a rear side 112 of the passenger seat 106. In some embodiments, the accessory 100 is connected to the vehicle by an accessory mounting bracket 120 and a support 122. A direction of forward swing of the accessory 100 is indicated by arrow 130.

It is noted that while the drawings herein show a right side view, looking backward from a front of the vehicle toward the rear of the vehicle, similar components are present on the opposite side of the vehicle. Only the right side view is shown herein to simplify the discussion of the embodiments. The system described herein is symmetrically applied to both the left side and the right side of the vehicle, and the system on both sides of the vehicle operates in a similar manner. In addition, the components of the system are positioned such that forward motion of the accessory is limited so that the accessory does not contact the passenger seat even when the passenger seat is in its furthest rearward reclining position.

Figure 2:
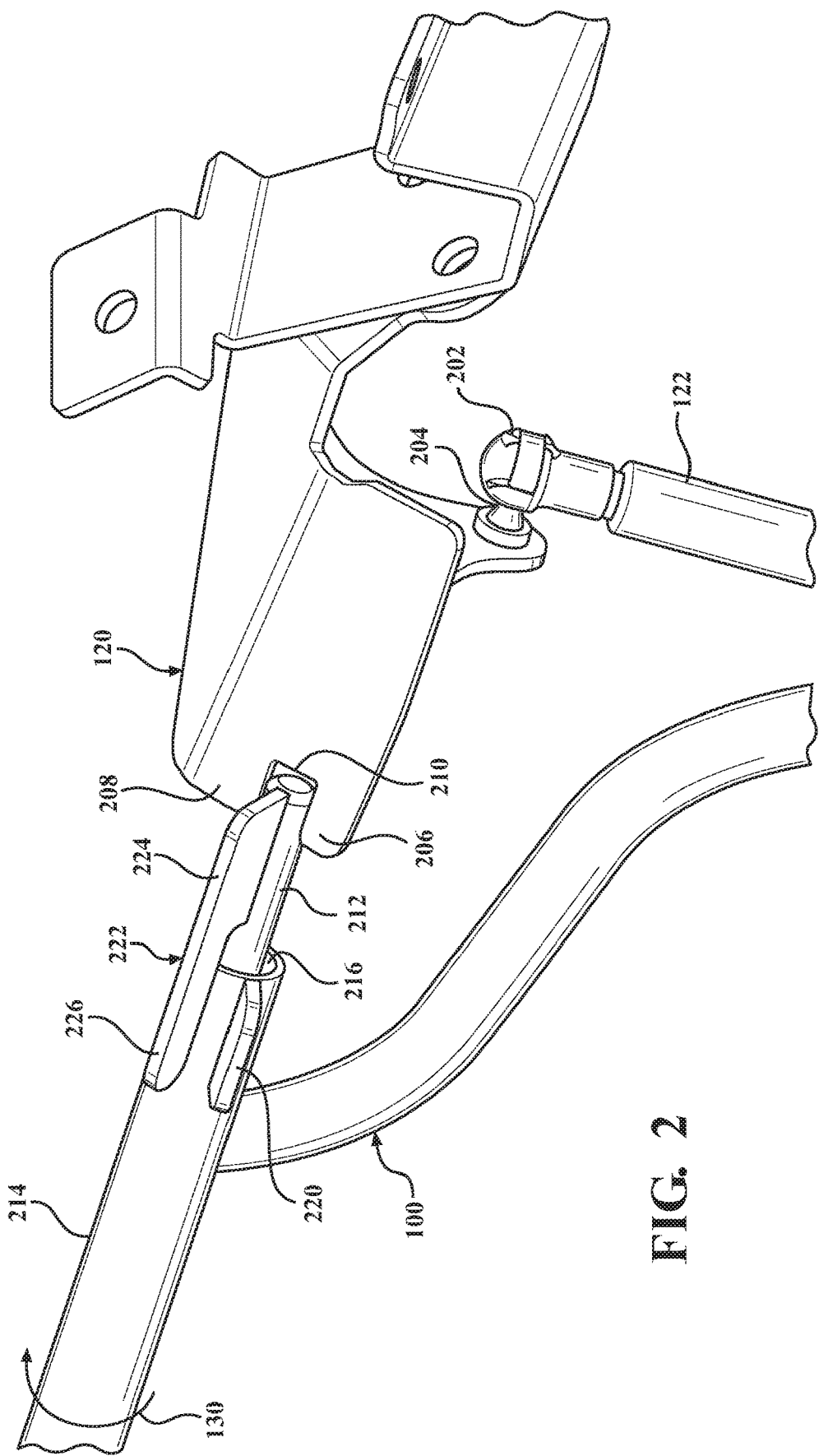
FIG. 2 is a top perspective view of a system for limiting forward motion of the accessory.

FIG. 2 is a top perspective view of a system for limiting forward motion of the accessory 100. In FIG. 2, forward motion of the accessory 100 toward the passenger seating area 104 is possible. In some embodiments, the accessory 100 is connected to the vehicle by the accessory mounting bracket 120 and the support 122. The support includes an upper end 202 which is mounted on a pivot member 204 connected to the accessory mounting bracket 120. The accessory mounting bracket 120 includes a pair of arms 206, 208 that define a linear gap 210 between them. One end of a bracket rod 212 is inserted in the linear gap 210 to support the accessory 100. An upper portion 214 of the accessory 100 includes an opening 216 which surrounds an opposite end of the bracket rod 212 (not shown in FIG. 2). The opening 216 is sufficiently large so that the upper portion 214 can rotate around the bracket rod 212, such that the accessory 100 can rotate forward toward the passenger seating area 104.

A first bracket 220 is attached to the upper portion 214 of the accessory 100. In some embodiments, the first bracket 220 is welded to the upper portion 214. However, any suitable method of attaching the first bracket 220 to the upper portion 214 is within the scope of this disclosure. A second bracket 222 is attached to the bracket rod 212. The second bracket 222 includes a short leg 224 that is attached to the bracket rod 212 and a long leg 226 that extends over the upper portion 214, giving the second bracket 222 an "L" shape and allowing the accessory 100 to rotate around the bracket rod 212. In some embodiments, the short leg 224 is welded to the bracket rod 212. However, any suitable method of attaching the short leg 224 to the bracket rod 212 is within the scope of this disclosure.

Figure 3A:
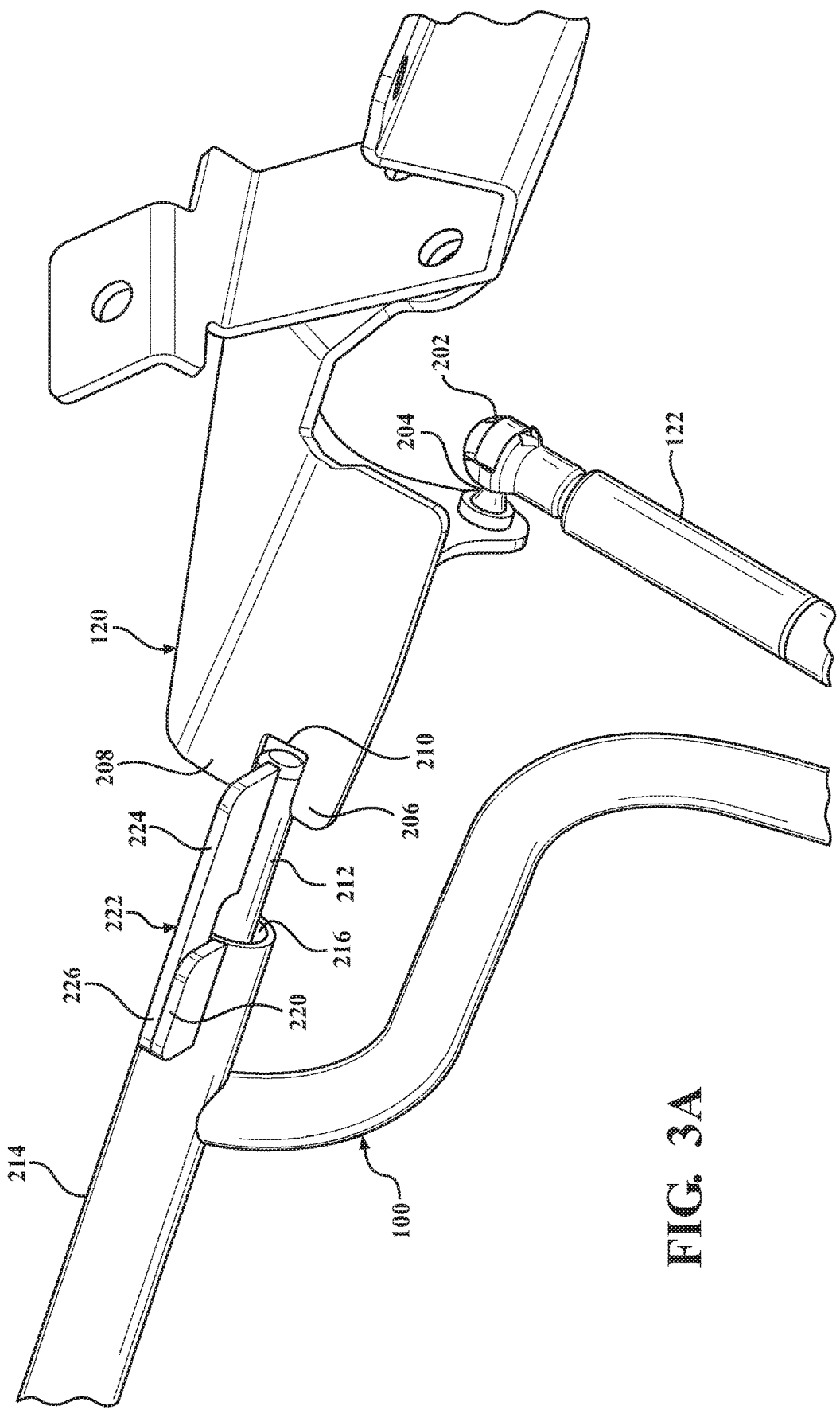
FIG. 3A is a top perspective view of the system of FIG. 2 when forward motion of the accessory is stopped.
Figure 3B:
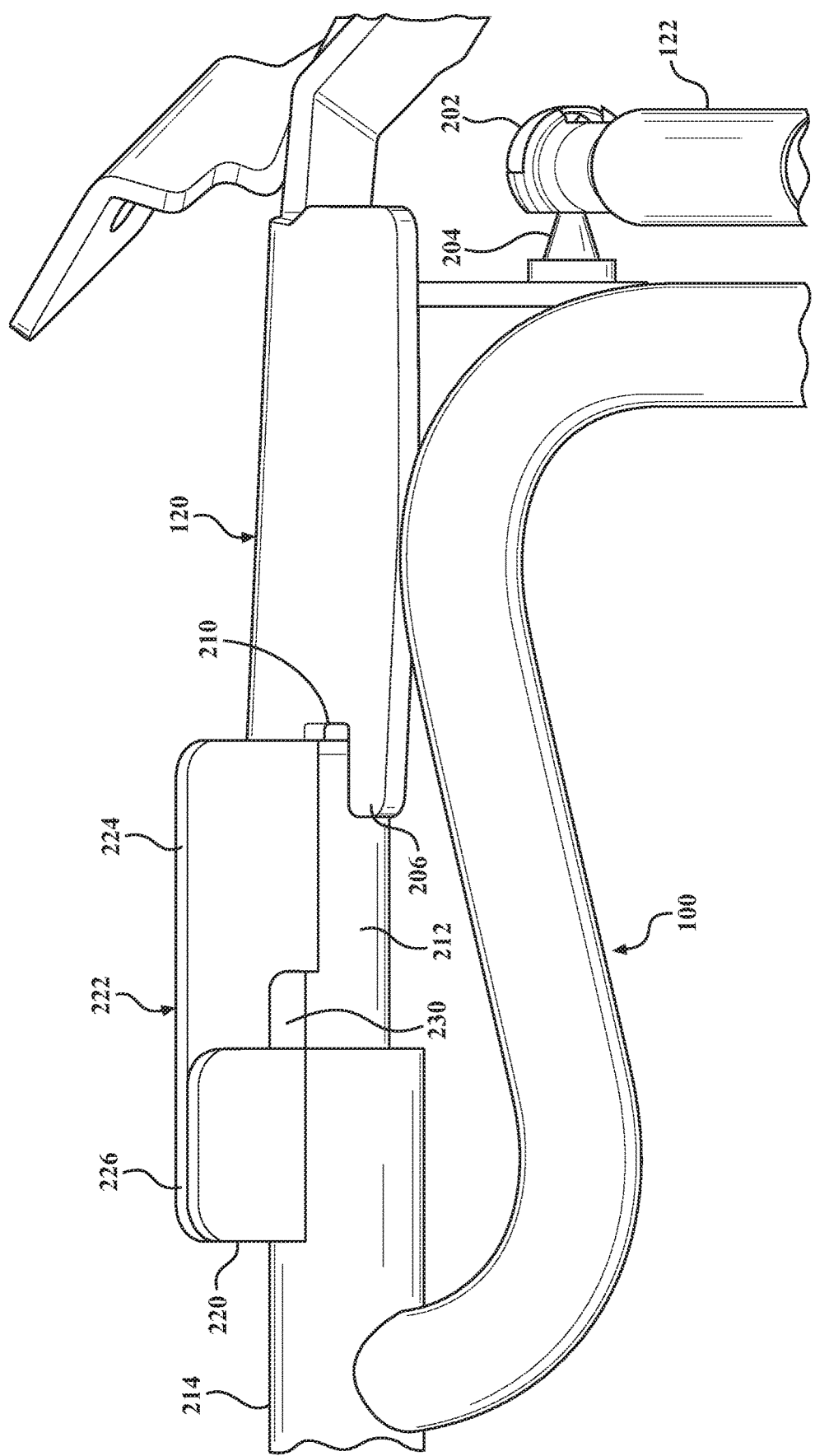
FIG. 3B is a front perspective view of the system of FIG. 2 when forward motion of the accessory is stopped.

When the accessory 100 swings forward toward the passenger seating area (in the direction shown by arrow 130), the forward motion of the accessory is stopped when the first bracket 220 contacts the long leg 226 of the second bracket 222, as shown in FIGS. 3A and 3B.

FIG. 3A is a top perspective view of the system of FIG. 2 when forward motion of the accessory 100 is stopped. When a rearward facing surface (relative to a front of the vehicle) of the first bracket 220 contacts a frontward facing surface (relative to the front of the vehicle) of the long leg 226, further forward motion of the accessory toward the passenger seating area 104 is stopped.

FIG. 3B is a front perspective view of the system of FIG. 2 when forward motion of the accessory 100 is stopped and the rearward facing surface the first bracket 220 contacts the frontward facing surface of the long leg 226 of the second bracket 222. Based on the "L" shape of the second bracket 222, there is a gap 230 defined by the short leg 224, the long leg 226, and the bracket rod 212. The gap 230 permits lateral motion of the upper portion 214 along the bracket rod 212 without interfering with the forward motion of the accessory 100.

While FIGS. 2-3B show the first bracket 220 and the second bracket 222 located near a headliner of the vehicle, the first bracket 220 and the second bracket 222 may also be located opposite to what is shown (this configuration is not shown in the drawings). In this configuration, the second bracket 222 is attached to an underside of the bracket rod 212 (facing away from the headliner of the vehicle). Similarly, the first bracket 220 is attached to an underside of the upper portion 214 such that as the accessory 100 rotates forward toward the passenger seating area 104, a frontward facing surface (relative to a front of the vehicle) of the first bracket 220 contacts a rearward facing surface (relative to the front of the vehicle) of the second bracket 222.

Figure 4A:
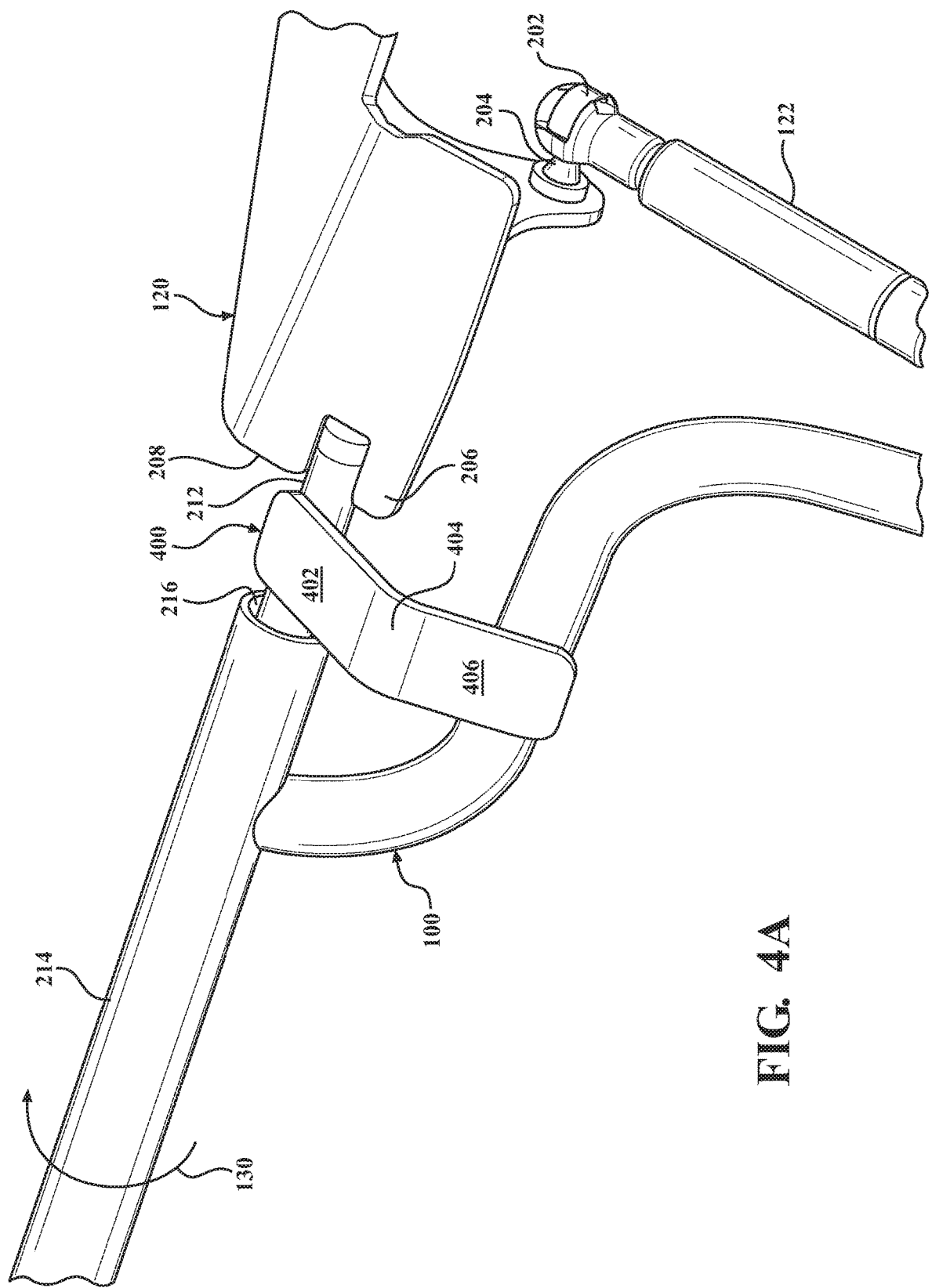
FIG. 4A is a top perspective view of an alternate embodiment of a system for limiting forward motion of the accessory.
Figure 4B:
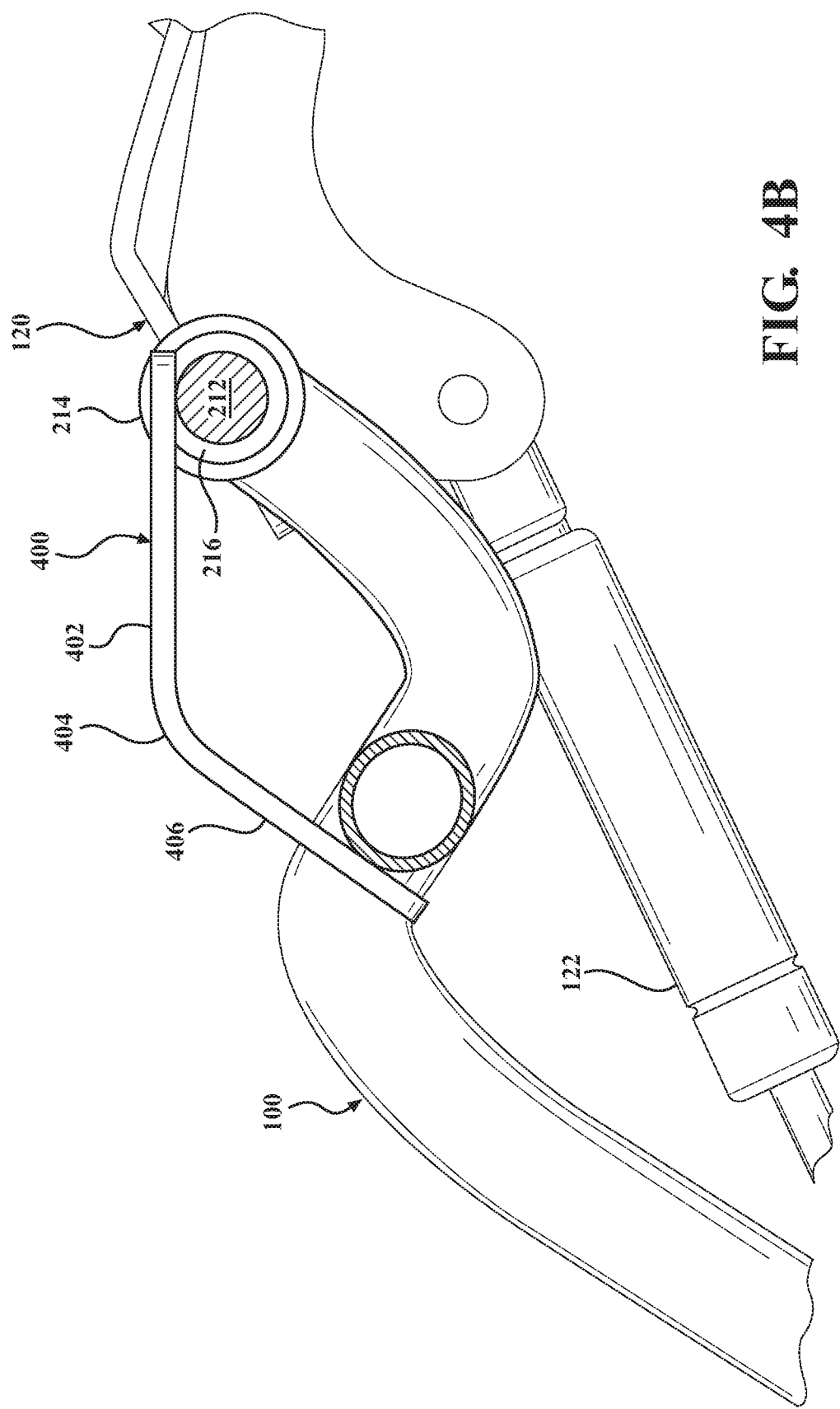
FIG. 4B is a cross-sectional view of the system shown in FIG. 4A when forward motion of the accessory is stopped.

FIGS. 4A-4B show an alternate embodiment of a system for limiting forward motion of the accessory 100. A bracket 400 is attached to the bracket rod 212. In some embodiments, the bracket 400 is welded to the bracket rod 212. However, any suitable method of attaching the bracket 400 to the bracket rod 212 is within the scope of this disclosure. In an alternate configuration, the bracket 400 may be integrally formed with the bracket rod 212.

The bracket 400 includes a first flat portion 402, an angled portion 404, and a second flat portion 406. The first flat portion 402 is attached to the bracket rod 212. The second flat portion 406 limits the forward motion of the accessory 100. The accessory 100 rotates around the bracket rod 212 until the accessory 100 contacts the second flat portion 406.

While the bracket 400 is shown having a first flat portion 402 and a second flat portion 406, other suitable shapes of the bracket 400 are possible such that the bracket 400 attaches at one end to the bracket rod 212 and an opposite end of the bracket 400 limits forward motion of the accessory 100 by contacting the accessory 100. For example, the second flat portion 406 may instead be curved or otherwise configured to match the shape of the accessory 100.

Figure 5A:
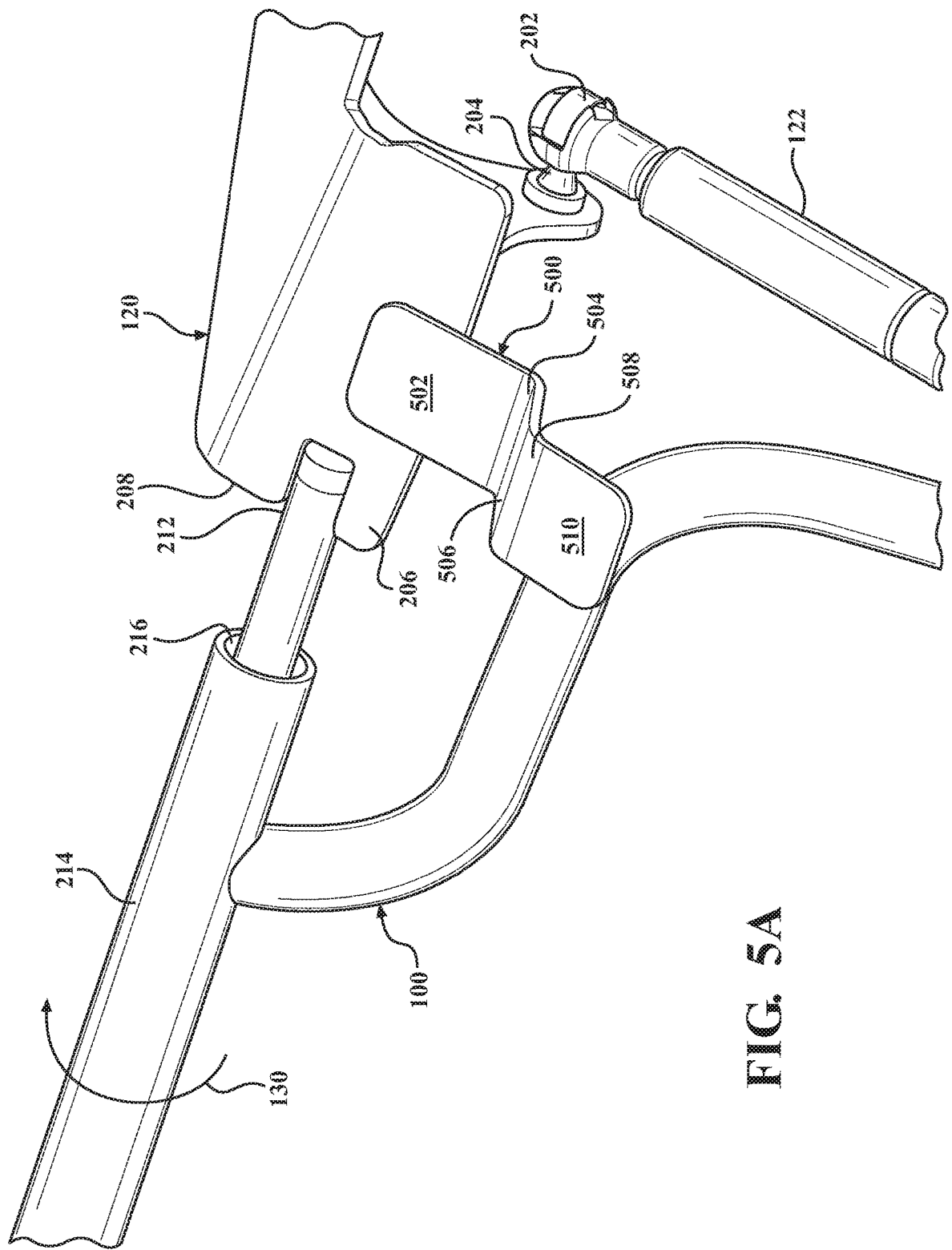
FIG. 5A is a top perspective view of another alternate embodiment of a system for limiting forward motion of the accessory.
Figure 5B:
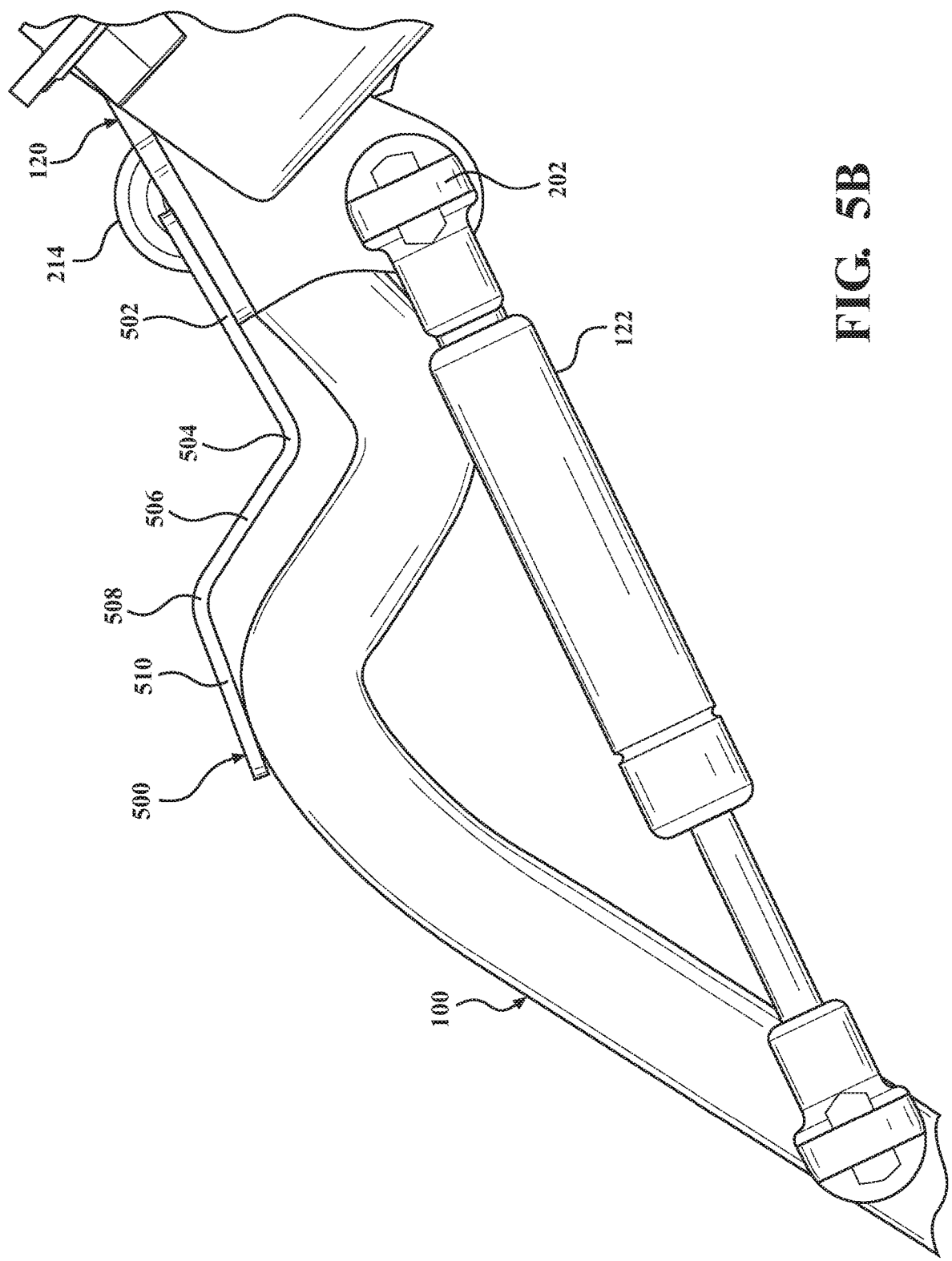
FIG. 5B is a side view of the system shown in FIG. 5A when forward motion of the accessory is stopped.

FIG. 5A-5B show another alternate embodiment of a system for limiting forward motion of the accessory 100. A bracket 500 is attached to the accessory mounting bracket 120. In some embodiments, the bracket 500 is welded to the accessory mounting bracket 120. However, any suitable method of attaching the bracket 500 to the accessory mounting bracket 120 is within the scope of this disclosure. In an alternate configuration, the bracket 500 may be integrally formed with the accessory mounting bracket 120.

The bracket 500 includes a first flat portion 502, a first angled portion 504, a second flat portion 506, a second angled portion 508, and a third flat portion 510. The first flat portion 502 is attached to the accessory mounting bracket 120. The third flat portion 510 limits the forward motion of the accessory 100. The accessory 100 rotates around the bracket rod 212 until the accessory 100 contacts the third flat portion 510.

While the bracket 500 is shown having a first flat portion 502, a second flat portion 506, and a third flat portion 510, other suitable shapes of the bracket 500 are possible such that the bracket 500 attaches at one end to the accessory mounting bracket 120 and an opposite end of the bracket 500 limits forward motion of the accessory 100 by contacting the accessory 100. For example, the third flat portion 510 may instead be curved or otherwise configured to match the shape of the accessory 100.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus to limit forward swing of an accessory mounted in a vehicle, the accessory separating a cargo area from a passenger seating area and configured to rotate around a bracket rod, the apparatus comprising:
   a first bracket attached to the accessory, the first bracket extending perpendicularly away from the accessory; and
   a second bracket attached to the bracket rod, the second bracket extending perpendicularly away from the bracket rod;
   wherein when the first bracket contacts the second bracket, forward swing of the accessory toward the passenger seating area is limited.

2. The apparatus of claim 1, wherein:
   the first bracket is rectangular in shape; and
   the second bracket is L-shaped.

3. The apparatus of claim 2, wherein the second bracket includes:
   a short leg connected to the bracket rod; and
   a long leg extending perpendicularly from the short leg, the long leg extending over a portion of the accessory, so that the accessory can rotate around the bracket rod, wherein when the first bracket contacts the long leg, forward swing of the accessory toward the passenger seating area is limited.

4. The apparatus of claim 1, wherein:
   the first bracket is attached to the accessory proximate to a headliner of the vehicle; and
   the second bracket is attached to the bracket rod proximate to the headliner of the vehicle.

5. The apparatus of claim 4, wherein the first bracket is positioned in front of the second bracket, relative to a front of the vehicle, whereby when the accessory swings forward toward the passenger seating area, a rearward facing surface of the first bracket contacts a frontward facing surface of the second bracket.

6. The apparatus of claim 1, wherein:
   the first bracket is attached to the accessory remote from a headliner of the vehicle; and
   the second bracket is attached to the bracket rod remote from the headliner of the vehicle.

7. The apparatus of claim 6, wherein the first bracket is positioned behind the second bracket, relative to a front of the vehicle, whereby when the accessory swings forward toward the passenger seating area, a frontward facing surface of the first bracket contacts a rearward facing surface of the second bracket.

8. An apparatus to limit forward swing of an accessory mounted in a vehicle, the accessory separating a cargo area from a passenger seating area and configured to rotate around a bracket rod, the apparatus comprising:
   a bracket attached to a mounting system for the accessory, the bracket including:
      a first portion attached to the mounting system; and
      a second portion configured to limit forward swing of the accessory toward the passenger seating area when the accessory contacts the second portion.

9. The apparatus of claim 8, wherein the first portion is attached to the bracket rod.

10. The apparatus of claim 8, wherein the first portion is attached to a mounting bracket of the mounting system.

11. The apparatus of claim 8, wherein the second portion is flat.

12. The apparatus of claim 8, wherein the second portion is curved.

13. The apparatus of claim 8, wherein the second portion is configured to match a portion of the accessory that contacts the second portion.

14. A vehicle, comprising:
   an accessory separating a cargo area from a passenger seating area, the accessory configured to rotate around a bracket rod; and
   an apparatus to limit forward swing of the accessory toward the passenger seating area, the apparatus including:
      a first bracket attached to the accessory, the first bracket extending perpendicularly away from the accessory; and
      a second bracket attached to the bracket rod, the second bracket extending perpendicularly away from the bracket rod;
   wherein when the first bracket contacts the second bracket, forward swing of the accessory toward the passenger seating area is limited.

15. The vehicle of claim 14, wherein:
   the first bracket is rectangular in shape; and
   the second bracket is L-shaped.

16. The vehicle of claim 15, wherein the second bracket includes:
   a short leg connected to the bracket rod; and
   a long leg extending perpendicularly from the short leg, the long leg extending over a portion of the accessory, so that the accessory can rotate around the bracket rod, wherein when the first bracket contacts the long leg, forward swing of the accessory toward the passenger seating area is limited.

17. The vehicle of claim 14, wherein:
   the first bracket is attached to the accessory proximate to a headliner of the vehicle; and
   the second bracket is attached to the bracket rod proximate to the headliner of the vehicle.

18. The vehicle of claim 17, wherein the first bracket is positioned in front of the second bracket, relative to a front of the vehicle, whereby when the accessory swings forward toward the passenger seating area, a rearward facing surface of the first bracket contacts a frontward facing surface of the second bracket.

19. The vehicle of claim 14, wherein:
the first bracket is attached to the accessory remote from a headliner of the vehicle; and
the second bracket is attached to the bracket rod remote from the headliner of the vehicle.

20. The vehicle of claim 19, wherein the first bracket is positioned behind the second bracket, relative to a front of the vehicle, whereby when the accessory swings forward toward the passenger seating area, a frontward facing surface of the first bracket contacts a rearward facing surface of the second bracket.

\* \* \* \* \*